US012753066B1

(12) United States Patent
Snyder

(10) Patent No.: US 12,753,066 B1
(45) Date of Patent: Oct. 6, 2026

(54) APPARATUS AND METHOD OF STIRRUP ADJUSTMENT

(71) Applicant: Snyder Saddle Solutions LLC, Yampa, CO (US)

(72) Inventor: Tyler Levi Snyder, Yampa, CO (US)

(*) Notice: Subject to any disclaimer, the term of this patent is extended or adjusted under 35 U.S.C. 154(b) by 0 days.

(21) Appl. No.: 19/076,358

(22) Filed: Mar. 11, 2025

Related U.S. Application Data

(60) Provisional application No. 63/563,737, filed on Mar. 11, 2024.

(51) Int. Cl.
*B68C 1/16* (2006.01)

(52) U.S. Cl.
CPC .................................... *B68C 1/16* (2013.01)

(58) Field of Classification Search
CPC .... B68C 1/16; B68C 1/02; B68C 3/00; B68C 1/025; B68C 2003/0025; B68C 1/00; B68C 1/027; B68C 1/10; B68C 2003/0008; B68C 2003/0075; B68C 3/02; B68C 1/18; B68C 2003/0041; B68C 3/0016
USPC ..... 54/46.1, 47, 44.1, 44.7, 44.5, 46.2, 44.4; 24/582.14; D30/142, 135
See application file for complete search history.

(56) References Cited

U.S. PATENT DOCUMENTS

| | | | | |
|---|---|---|---|---|
| 1,365,551 | A * | 1/1921 | Settles | B68C 1/16 24/176 |
| 2,192,640 | A * | 3/1940 | Fields | A44B 11/22 24/176 |
| 2,482,153 | A * | 9/1949 | Cavin | B68C 1/16 54/46.1 |
| 3,096,552 | A * | 7/1963 | Kreger, Jr. | B68C 1/16 24/177 |
| 3,371,467 | A * | 3/1968 | Salisbury, III | B68C 1/02 54/44.7 |
| 7,249,446 | B1 * | 7/2007 | Hapner | B68C 1/16 54/46.1 |
| 10,035,695 | B2 | 7/2018 | Rider | |
| 2014/0260125 | A1 * | 9/2014 | Rehmeyer | B68C 1/027 54/46.1 |
| 2020/0216295 | A1 * | 7/2020 | Coffman | B68C 1/16 |
| 2020/0283284 | A1 * | 9/2020 | Marshall | B68C 1/16 |

* cited by examiner

*Primary Examiner* — Zoe Tam Tran
(74) *Attorney, Agent, or Firm* — Reilly Intellectual Property Law Firm

(57) ABSTRACT

There is disclosed an adjustment device for saddle stirrups and more particularly a tension anchor device in conjunction with saddle stirrups allowing for real time adjustment of the stirrups while a rider is on the saddle with feet in the stirrups.

16 Claims, 7 Drawing Sheets

APPARATUS AND METHOD OF STIRRUP ADJUSTMENT

CROSS-REFERENCE TO RELATED APPLICATIONS

This application claims priority to and claims the benefit of U.S. Provisional Application No. 63/563,737 filed Mar. 11, 2024, entitled "STIRRUP ADJUSTMENT DEVICE", the entire contents of which are hereby expressly incorporated herein by this reference including, without limitation, the specification, claims and abstract, as well as any figures, tables, or drawings thereof.

TECHNICAL FIELD

An adjustment device for saddle stirrups and more particularly a tension anchor device in conjunction with saddle stirrups allowing for real time adjustment of the stirrups while a rider is on the saddle with feet in the stirrups.

BACKGROUND

A conventional western type riding saddle includes a framework or tree defining the shape of the saddle whereby the typical saddle tree is ridged and consists of spaced apart parallel bars connecting a horn, pommel and cantle with the seat disposed therebetween resting on the bars. The tree is composed of wood, metal, plastic, fiberglass, synthetic material, leather, or a combination thereof. The tree is usually covered with leather on all visible parts of the saddle. The seat may have foam rubber or other cushioning materials disposed between the tree and top layer of leather to provide additional comfort to the rider. Saddles are typically used for placement on an animal, such as a horse, donkey, mule, elephant, or camel to enable a rider to position themselves on the back of the animal.

Typically, a breathable material such as sheepskin is placed on the underside of the saddle covering both the tree and the underside of the skirts. Cinch rings are attached to the tree as part of the rigging that includes the arrangement of rings and plate hardware to connect the girthing system for holding the saddle on the horse. Stirrups come in a wide variety of styles, sizes and materials and are attached to most saddles by adjustable stirrup leathers, which can be altered in length to fit both the size of the rider and the need to remain over the horse's optimal center of balance. Depending on the design of a saddle, stirrup leathers may be attached to a "stirrup bar," a small forged steel bar embedded into the saddle tree, or may be wrapped around the bars of the tree itself. Because different riders are of different heights, and stirrups also may need to be adjusted up or down to accommodate different types of activity and different riders.

Stirrup leathers generally have buckles and holes that allow the length to be adjusted. In order to adjust the stirrups, generally the rider must dismount the animal to have access to the stirrup leathers. The other option is to have a third party adjust the length while the rider is on the horse. This typically requires adjustment on both stirrups and is time consuming. Further, a rider may find that the lengths of the stirrups are uneven or incorrect after riding the horse for a few minutes, requiring further adjustment of the stirrups. Additionally, as the rider's whole weight must be carried on one side when mounting, one stirrup strap often becomes stretched longer than the other, usually the left one, because most mounting occurs on that side. Again, any unevenness in the leathers can be managed by adjusting the stirrup length but this adjustment must be done either by a third party or the dismounted rider. Finally, if the stirrup leathers cannot be sufficiently adjusted, extra holes must be punched in the leathers to allow for buckling at a different length than the existing pre-punched holes provided by the saddle manufacturer. There is a need for a stirrup adjustment assembly that can be executed while the rider is in the saddle.

SUMMARY

One feature of the present disclosure, as will be described in greater detail below, is the ability of the rider to adjust the length of the stirrups while remaining in the saddle.

Another feature of the present disclosure is the ability of the rider to easily and independently adjust the desired length of each stirrup.

Another feature of the present disclosure is the capability to retrofit an existing saddle with the adjustment system.

Another feature of the present disclosure is the ability of the rider to adjust the length of the stirrup while leaving the rider's foot in the stirrup.

It is an object to provide for real time adjustment of stirrups without dismounting from the saddle.

It is an object to allow for lengthening of the stirrup for ease of mounting and then easy readjustment of the stirrup once the rider is mounted.

It is a further object to provide an adjustment device that may be retro-fit with an existing saddle.

There is disclosed a stirrup adjustment assembly allowing for easy adjustment of stirrups while a rider is in the saddle.

The exemplary aspects disclose an adjustable stirrup assembly for a riding saddle, the saddle having a cantle, seat, and at least one stirrup, the assembly comprising at least one tension device having a spool member secured to the saddle, at least one adjustment member having a first terminal end secured to the tension device, a second terminal end secured to at least one clamp member, and the at least one clamp member secured to a stirrup member.

In another aspect there is an apparatus for adjusting the length of a rider's stirrup on a saddle, the saddle having a seat, at least one stirrup and a securing device, comprising a tension device having a housing, spool member and rotation adjustment member, an adjustment member having a first terminal end rotatably secured to the spool member and a second terminal end secured to a clamp member, the clamp member secured to a stirrup member; and the stirrup assembly having a loop member.

In a further example, there is a method of adjusting a stirrup while mounted in a saddle, the steps comprising mounting of a saddle by a rider, selecting a length of stirrup based on leg position, rotating a spool member within a tension device secured to the saddle thereby adjusting a length of an adjustment member secured to a stirrup member.

BRIEF DESCRIPTION OF DRAWINGS

An understanding of the features and advantages of the present invention will be obtained by reference to the following detailed description that sets forth illustrative embodiments, in which the principles of the invention may be utilized, and the accompanying drawings of which.

The figures herein are for illustrative purposes only and are not necessarily drawn to scale.

DETAILED DESCRIPTION

Figure 5:
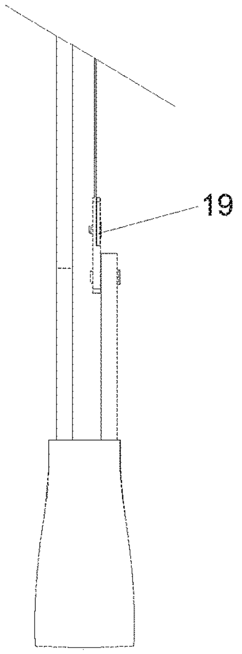
FIG. 5 is a cut away side view of the stirrup of FIG. 1.

There is disclosed a stirrup adjustment assembly as shown in FIGS. 1-11. In summary, the stirrup adjustment system broadly comprises a stirrup adjustment assembly that employs a tension device 13 linked to a cable member or adjustment member 15 that is secured to a clamping plate 19 as shown in FIG. 5 that may be raised or lowered. The clamping plate is secured to the stirrup leather or used in association with the stirrups to provide an anchor for the cable and tension device and causes the stirrups to be raised or lowered to the desired length. The cable system includes the tension device with a spool or reel for adjustment of saddle stirrups without dismounting the saddle.

Figure 10:
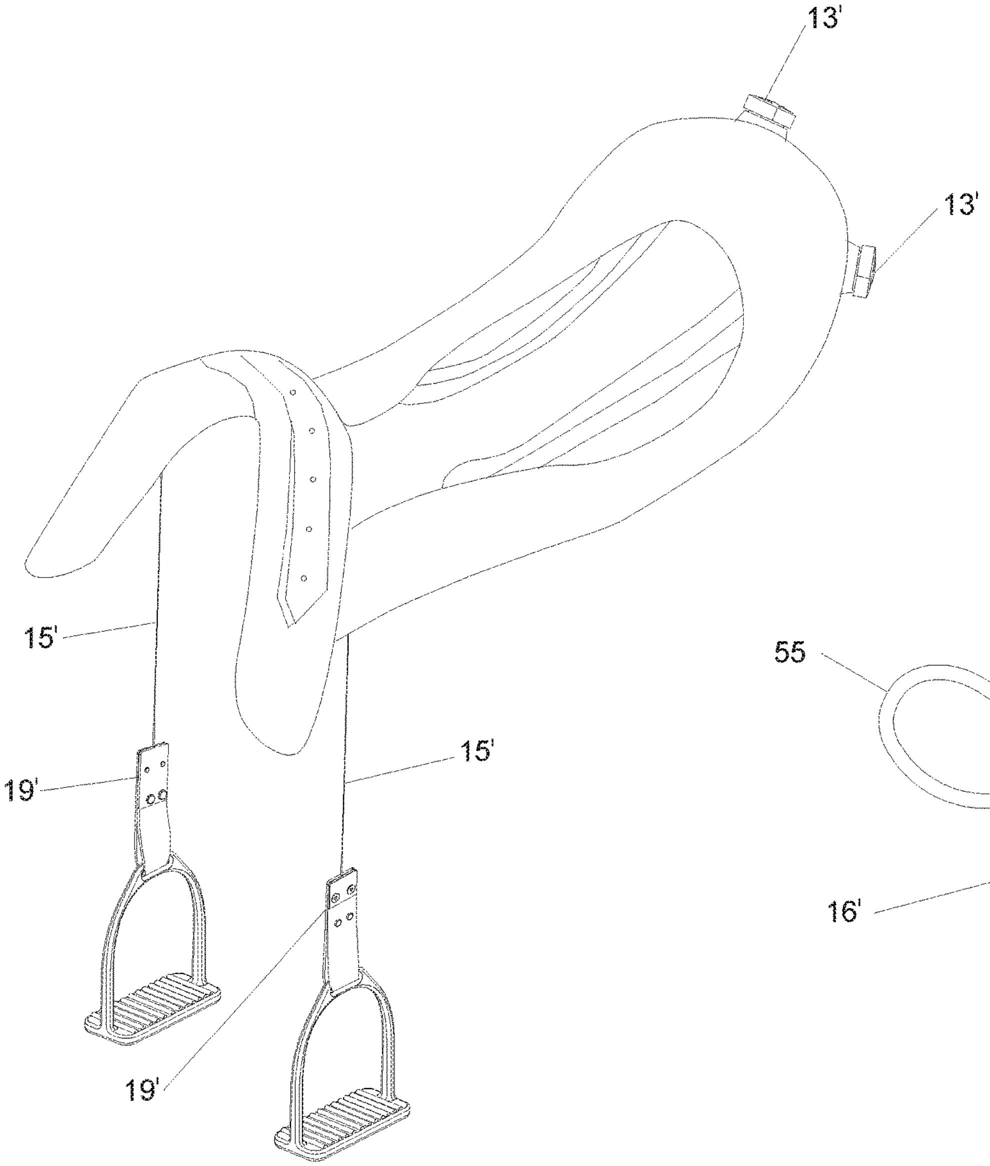
FIG. 10 is a perspective side view of an English saddle with an apparatus for stirrup adjustment.
Figure 11:
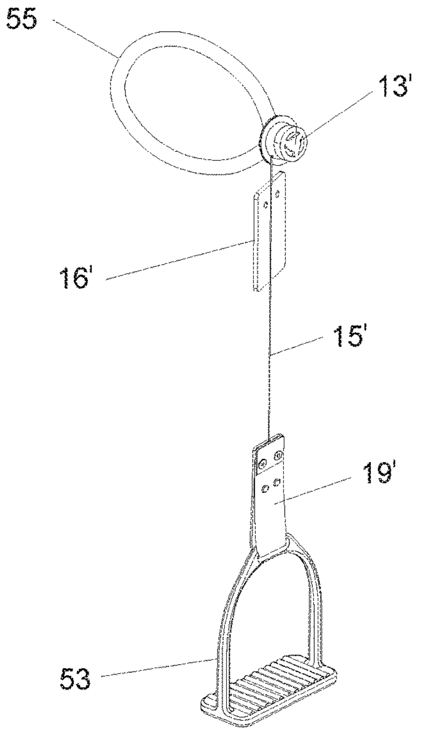
FIG. 11 is a perspective view of an alternate form of FIG. 10.

Referring now to the drawings, and more particularly to FIGS. 1-9, a saddle 10 is shown in conjunction with at least one stirrup that is typically secured to the saddle with a buckle assembly. This form of saddle is commonly known as a western style saddle. It is to be understood that the concepts described herein are applicable to a retro-fit of the western saddle as well as other type saddles, such as English style saddles, as shown in FIGS. 10 and 11.

Figure 1:
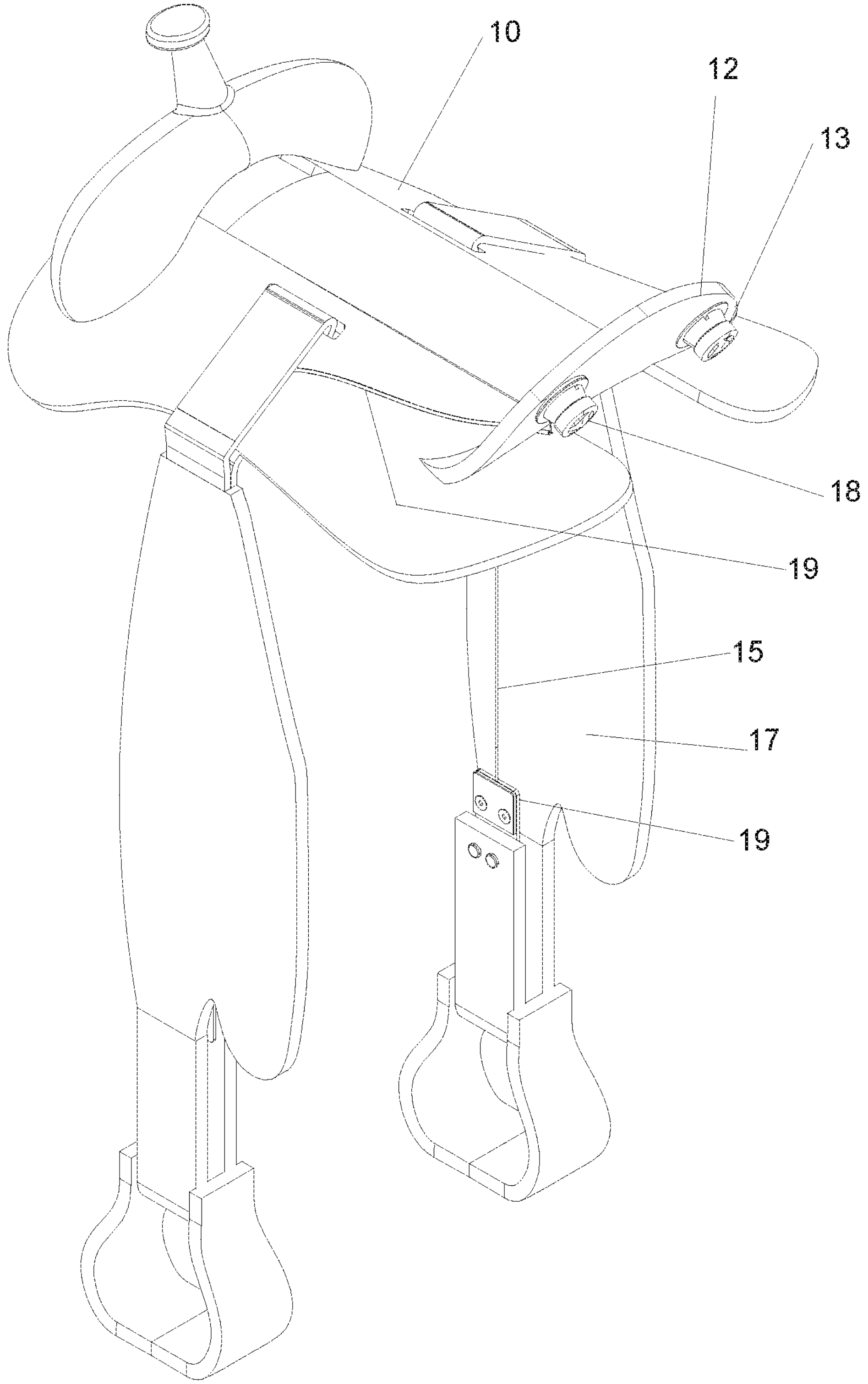
FIG. 1 is a perspective side view of a western saddle with an APPARATUS AND METHOD OF STIRRUP ADJUSTMENT.
Figure 2:
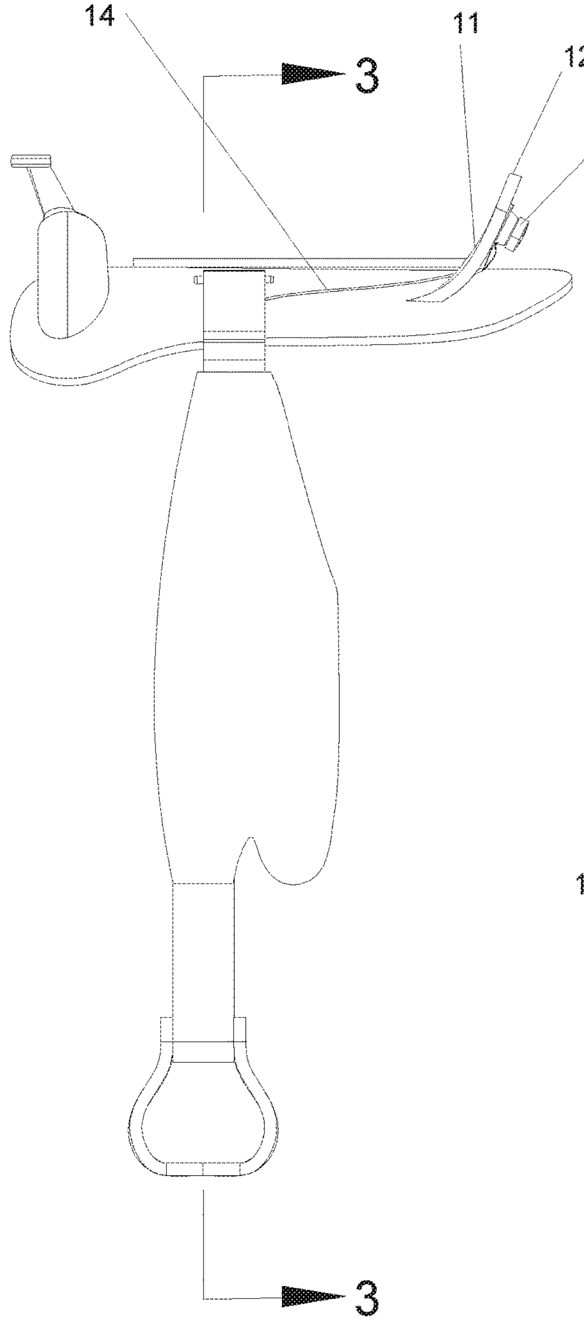
FIG. 2 is a side view of FIG. 1.
Figure 3:
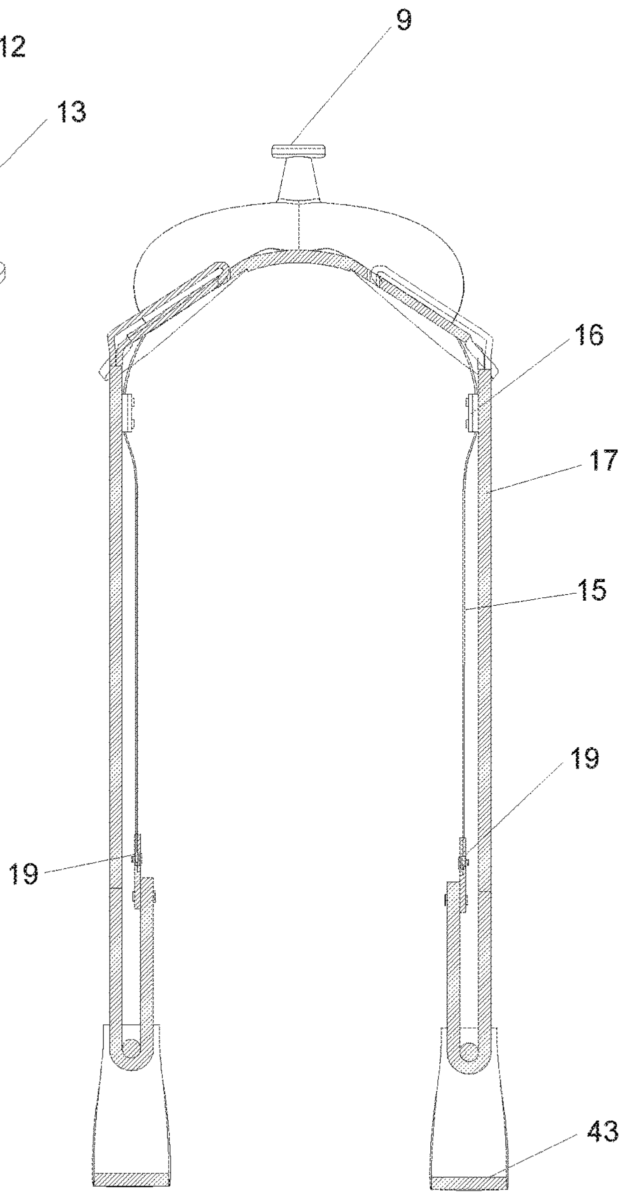
FIG. 3 is a cross-section about lines 3-3 of FIG. 2.
Figure 4:
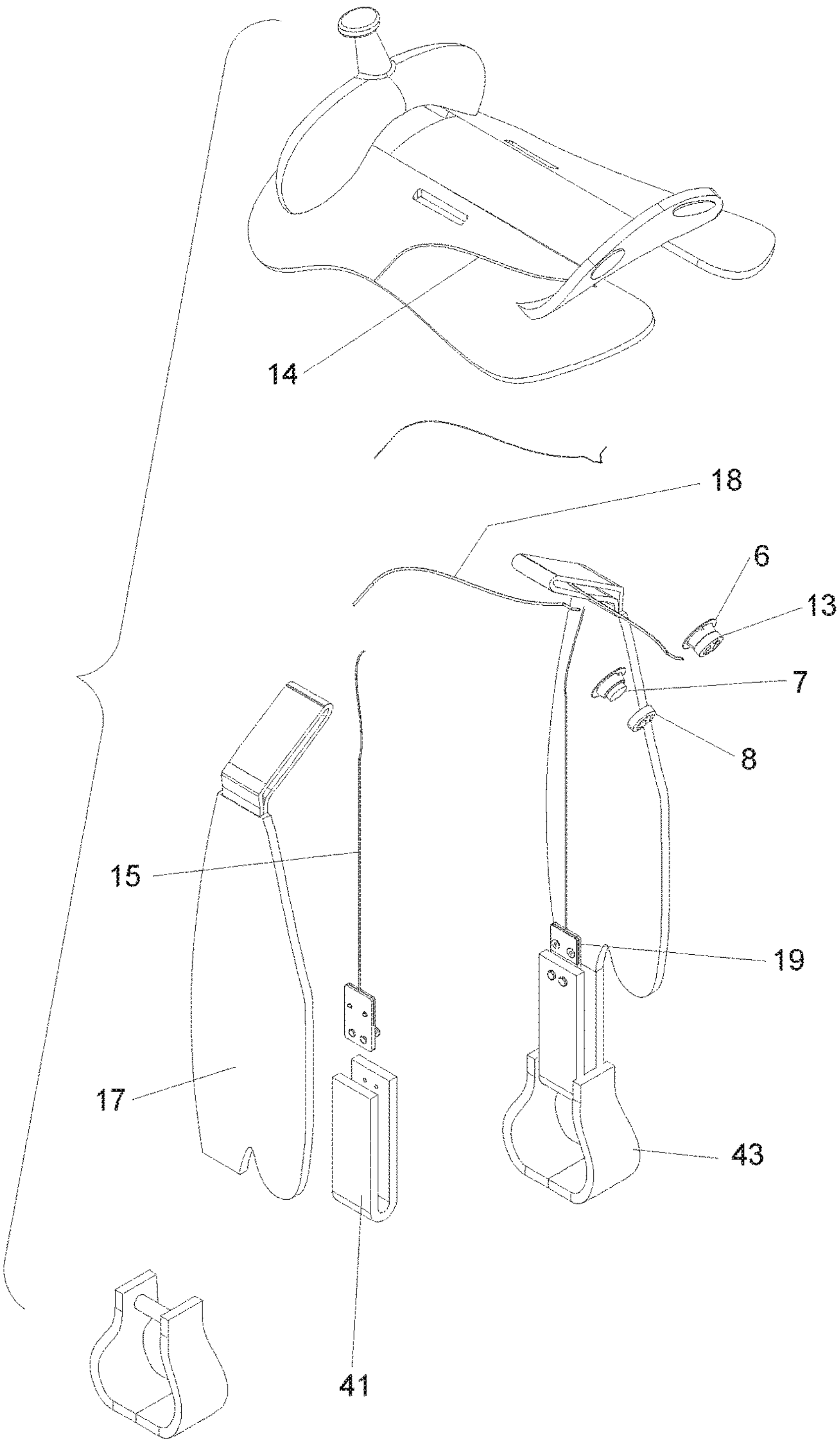
FIG. 4 is an exploded view of FIG. 1.

For clarity, the saddle is shown in simplified form without rigging and components that are typically present. FIGS. 1, 2 and 4 illustrate the saddle 10 with a horn 9, cantle 11 with a Cheyenne Roll 12 having a tension device 13 secured along a back portion of the Cheyenne Roll 12. As set forth above, the western saddle may be manufactured out of leather, plastics, wood, or combination thereof. The adjustment member 15 may be embedded within the saddle along the seat, and spanning the cantle, under the seat, along the fender and the stirrup leather to a clamp member 19. One end of the adjustment member may be passed through the tension device 13 which is secured to the underside or rear portion of the cantle of the saddle. In another aspect, the tension device may be secured along the sides of the Cheyenne Roll 12, or anywhere on the saddle without departing from the scope of this disclosure.

There are one or more tension devices 13 secured to the saddle with bolts or any type of securing device. The tension device may also be built into the saddle during manufacturing. The tension devices are aligned in spaced relation to one another, along opposite sides of the Cheyenne Roll, and situated on the back or rear side of the cantle to provide easy access to the rider without interfering with the comfort of the saddle to the rider. In a further aspect, there is one tension device that controls both stirrups simultaneously.

In a further aspect, the tension device(s) may be secured to the side of the saddle, just above or underneath the stirrup leather or near the cantle. The location of the tension device is to allow for easy access to the device while mounted in the saddle.

The tension device 13 may be any type of spooling anchor that allows for adjustment of a length of the adjustment member 15. In one aspect, the tension device 13 comprises a ratchet dial housed within a cylinder which is generally known in the prior art. In an exemplary embodiment, the tension device comprises a housing 6 with a spool or reel 7 positioned therein and a rotation control member or knob 8 that is coupled with the spool 7, such as a ratchet dial, that allows the spool to rotate within the housing 6. A length of the adjustment member 15 is operatively secured around the spool 7 and the knob may be incrementally rotated to allow for lengthening or shortening of the adjustment member, thereby impacting the length of one or both stirrups. In a further aspect, the tension device comprises a spring or tensioning device that maintains tension in the adjustment member providing a load holding function, preventing unwanted loosening of the adjustment member 15 on the spool 7.

In one aspect, operation of the tension device may be manual with incremental adjustment of a rotation control member by hand. In another aspect, the operation of a form of tension device may be automated with automated dial settings and use of a rechargeable battery.

In another form of tension device, the housing includes a lever, turn-key, ratchet, knob, or spool that allows for incremental adjustment of a cable member or the adjustment device while preventing unauthorized or unwanted rotation or loosening of the cable or strap and the like. The turn key uses rope whereby a single rope is routed between dual sides of a housing that has a ratchet and turn key for adjustment of the rope. Further, the tension device may include visible markings on the device to determine the level of adjustment.

Other exemplary embodiments include a release mechanism that comprises an actuating mechanism (e.g., a handle and trigger) which controls a cam mechanism, forcing an upper and lower jaw apart on the release mechanism, against the power of a spring, allowing the upper jaw and lower jaw to rotate about a spool for adjustment of the tension device. The examples described above are for example purposes and other forms of tension mechanisms or rotary devices are contemplated and are not a departure from the scope of the disclosure. In another exemplary embodiment, a loop lock device may be used utilizing a continuous, looped rope member that is secured to the stirrups at each terminal end and a center locking attachment device along an upper portion of the saddle. The center locking device has dual blocks that can be tightened or loosened for length adjustment of the rope member. In a further exemplary embodiment, a manual locking device is used wherein a rope or cable is used in conjunction with a stop mechanism secured to a rear portion of the saddle behind the cantle. The stop mechanism secures a first terminal end of the rope member and the stop mechanism may be manually inserted in slot members located on a platform to allow for adjustment of the length of the rope. The rope member has a second terminal end secured to the stirrup whereby adjustment of the stop member results in shortening or lengthening of the stirrup.

The saddle includes a channel or groove 14 for directing and securing a cable housing 18 or, alternatively, the adjustment member 15. The channel 14 is designed to span a side length of the saddle and is adapted to receive a cable housing 18 which is secured in the channel 14. The cable housing 18 spans the length of the saddle, from the tension device 13, along a side portion of the saddle and terminates at a retainer plate 16. Alternatively, the cable housing may further extend the length of the adjustment member 15, terminating at the clamp member 19. The cable housing 18 is designed for passage of the adjustment member 15 therethrough and is made of a lightweight durable plastic tubing designed to allow the adjustment member to pass therethrough while protecting the rider and the horse in the case of an adjustment member malfunction.

The adjustment member 15 is a wire, rope or any type of strap or suitable material capable of supporting the weight of a rider, such as nylon, Kevlar, or leather. One aspect of the adjustment member employs a 500 lb. minimum aircraft cable or Kevlar. The aircraft cable is galvanized or stainless steel with medium to high tensile strength having strands of wires laid around a center wire. Kevlar cable may also be used or any type of cable, wire or strap that is high load bearing, and any material that can withstand up to 1000 lbs. of pressure to ensure that the cable, wire, or strap does not snap when weight is applied by the rider on the stirrups. The material must have high tensile strength while also allowing it to be malleable and lightweight for placement through the cable housing as well as through the tension device 13. In one form, the adjustment member 15 is defined as a cloth rope, steel rope, wire or steel cable, cord or a cloth strap that can be wrapped around spools within the housing, allowing for incremental release or uptake of the adjustment member 15 based upon turning of the ratchet dial. Other forms of adjustment member may be used without departing from the scope of the disclosure.

In another aspect, utilization of a wire rope cable that is capable of supporting a 300 lb. force with a ⅛" diameter. In a further aspect, a strap with a breaking strength greater than about 1,000 pounds is used. Other forms of adjustment device may be used without departing from the scope of this disclosure.

The adjustment member 15 is secured at one end to the tension device 13, threaded through the cable housing 18 that is mounted in the channel 14, as described above. The opposite end of the adjustment member is secured to the clamp plate providing an anchor for the adjustment device, allowing tensioning and de-tensioning or lengthening and shortening of the adjustment member which in turn allows for adjustment of the saddle stirrups.

Figure 8:
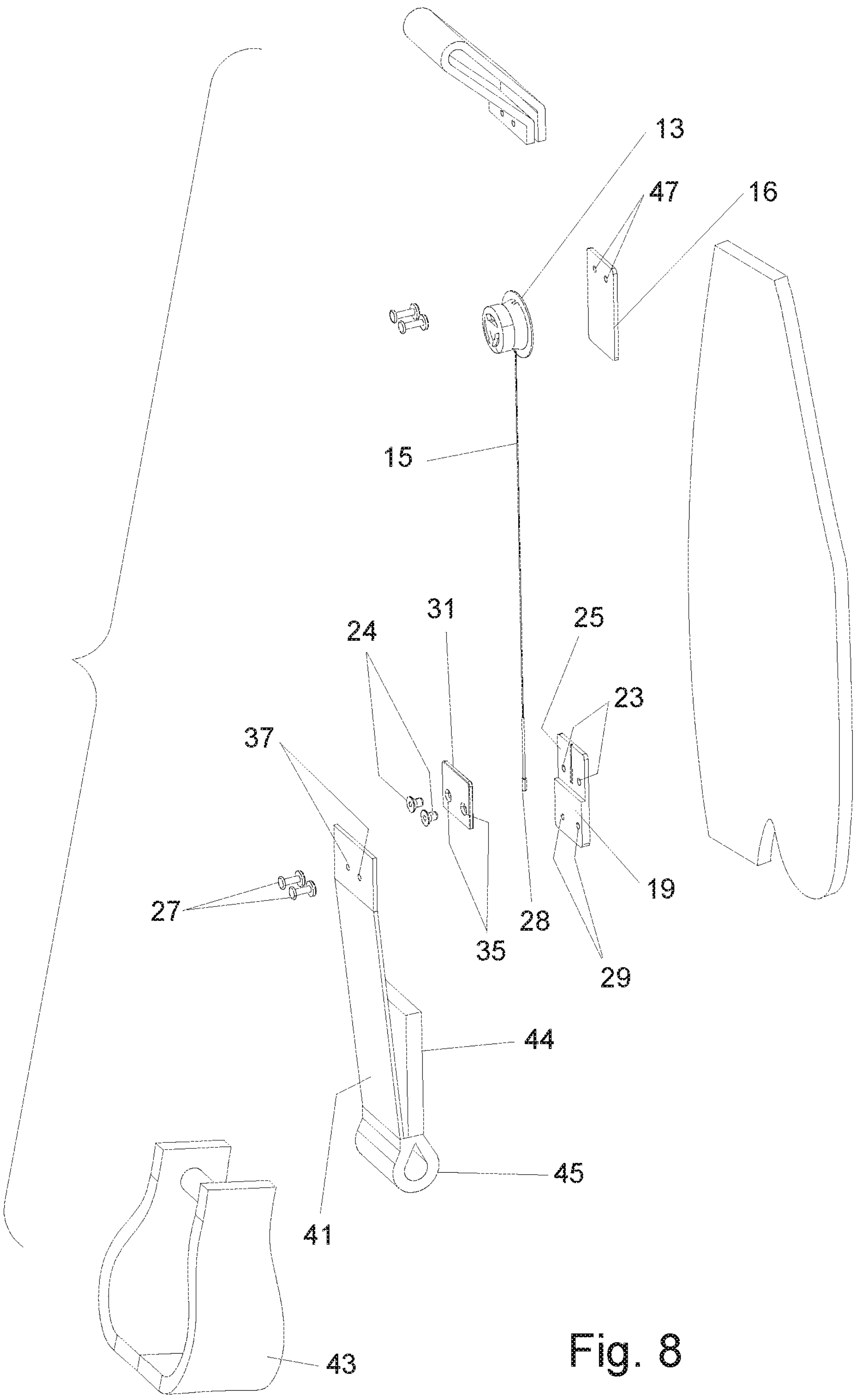
FIG. 8 is an exploded view of an alternate form of FIG. 1.
Figure 9:
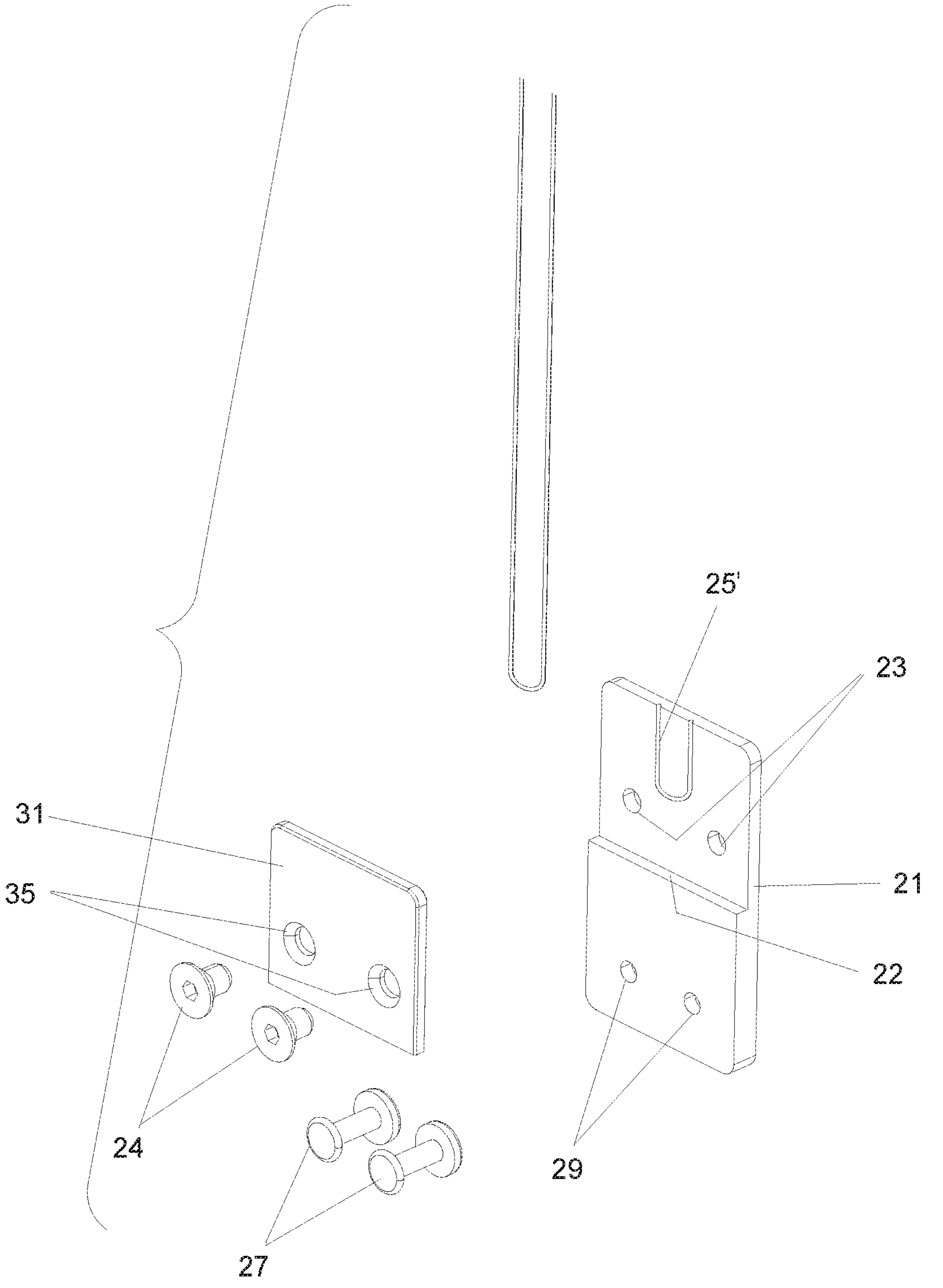
FIG. 9 is an exploded view of a clamp shown in FIG. 1.

In one aspect, the clamp plate 19, as shown in detail in FIGS. 8 and 9, comprises a first plate 21 that is made of high quality stainless steel or aluminum to provide strength. The first plate member is rectangular in shape having two upper and two lower threaded screw or rivet openings, 23 and 29, respectively, that are sized to accommodate high quality stainless steel or zinc plated, counter sunk screws 24, designed to threadedly engage with the threaded screw openings 23. Copper rivets 27, for example purposes only, are designed to pass through the rivet openings 29 in the first plate 21 and through rivet openings 37 in a stirrup plate 34 that is secured to stirrup leather 41 which in turn is linked to a stirrup 43. Any type of securing device may be used in place of rivets without departing from the scope of the disclosure. The stirrup plate 34 is formed of high quality stainless steel but may also be formed of reinforced leather or a rigid plastic. The stirrup leather extends downwardly from the stirrup plate 34 forming a loop 45 that is secured to the stirrup 43. The loop 45 allows the length of the stirrup 43 to be lengthened or shortened through connection with the clamp assembly 19. An opposite end 44 of the stirrup leather that is secured to the stirrup plate 34 is secured to the fender 17. Other configurations of securing the stirrup may be used without departing from the scope of the disclosure.

A second plate 31 is of square configuration and comprising high quality stainless steel, aluminum or rigid plastic. The second plate also has at least two threaded openings 35 that are sized to accommodate the screws 24. The second plate 31 is secured to the first plate 21 with the threaded screws 24, for example but any type of securing mechanism may be used. The first plate may have a beveled edge 22 that is designed to provide a uniform surface once the second plate is secured to the first plate. The upper portion of the first plate comprises a grooved surface or longitudinal channel 25 that is adapted to accommodate a terminal end 28 of the adjustment member. Alternatively, the upper plate may have a u-shaped channel 25' that accommodates a loop of the adjustment member.

The clamp plate 19, once the adjustment member 15 is placed within the longitudinal channel 25 and the second plate 31 is secured to the first plate 21 with the threaded screws 14, is riveted or secured to the stirrup plate 34 with the rivets 27 or form of securing device. This allows for the clamp plate and the loop 41 to move upwardly and downwardly, thereby raising and lowering the stirrup 43, depending upon the level of tension or adjustment from the tension device 13. The system, as described above, is used for each stirrup thereby allowing for independent adjustment of the stirrup length for each stirrup suspended from the saddle.

In one aspect, a retaining plate 16 is secured to the fender 17 for guiding the adjustment member 15 and/or tubing housing and preventing the adjustment member from displacement. The retaining plate 16 is formed of stainless steel or rigid plastic and having dual openings 47 for passage of securing devices for attachment to the fender 17. Other forms of securing device may be used without departing from the scope of the disclosure.

In another exemplary aspect, a clamping member (not shown) may be used secure the stirrup in position, thereby reducing the load member on the adjustment member.

Figure 7:
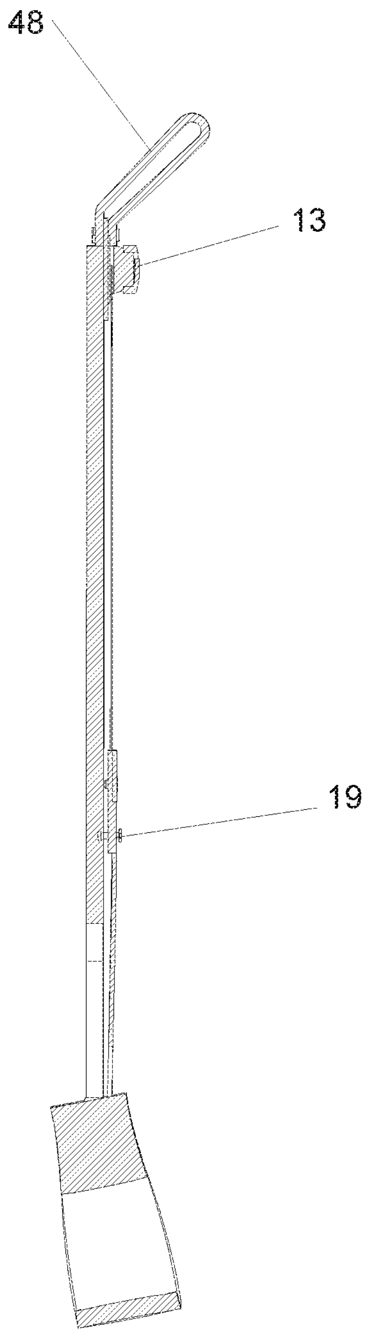
FIG. 7 is a cross-section about lines 7-7 of FIG. 6.
Figure 6:
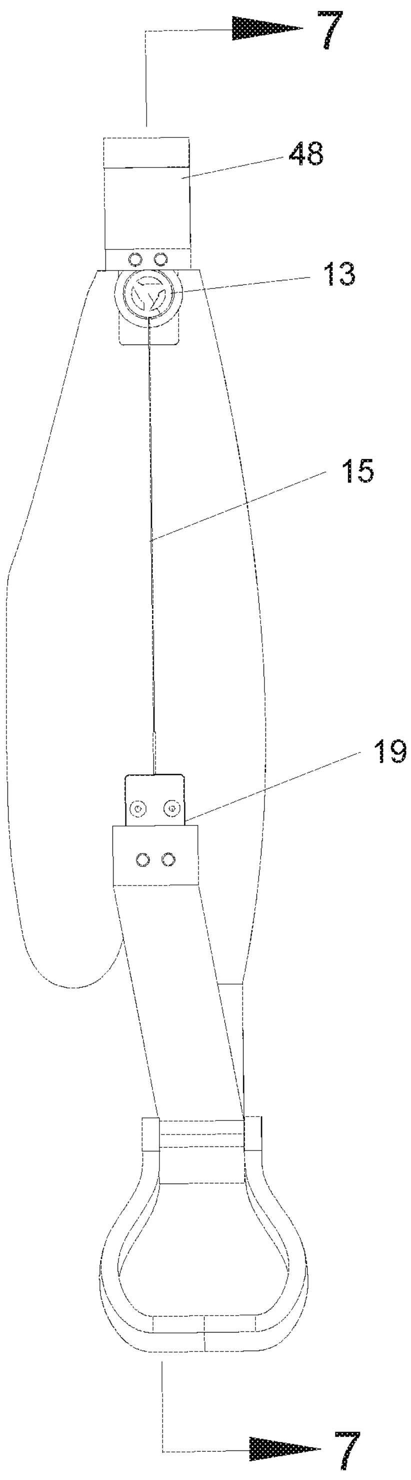
FIG. 6 is a sectional view of the stirrup of FIG. 1.

The standard western saddle, as shown in FIGS. 1-4 may be manufactured with the stirrup assembly described above. In a further aspect, as shown in FIGS. 6-8, the stirrup assembly may be manufactured in conjunction with the fender and stirrup for retro-fitting with an already existing saddle. The stirrup assembly as described above has similar parts with the retro-fit assembly, with like part numbers correspondingly enumerated. As shown in FIGS. 6-8, the fender 17 includes a looped securing member 48 that is secured to the fender 17 and allows for attachment to an existing saddle at a desired location with a securing device such as a stirrup bar (not shown). In one aspect, tension device is secured to an upper portion of the fender, allowing for adjustment of the stirrup in the same manner as described above.

In use, the stirrup adjustment assembly may be used to lengthen the stirrup, typically the left stirrup, prior to mounting by the rider. The rider generally mounts on the left side of the saddle by placing the rider left foot in the left stirrup, using the left stirrup as a stabilization point to swing the rider right leg over the saddle. The assembly is then readily accessible to the rider once the rider mounts the horse. The rider then may assess the length and comfort of the stirrups. If adjustment is needed, the rider accesses the tension device(s), lengthening or shortening the adjustment member by rotating the knob on the tension device. As described above, this may occur through a knob, lever, ratchet, or friction member that allows for incremental lengthening and shortening of the adjustment member. Often, after riding for a period of time, a rider may desire to assess and re-adjust the stirrups. This can be easily accomplished without dismounting from the saddle.

In a further aspect, there is disclosed in FIGS. 10-11, a form of stirrup adjustment assembly that accommodates an English style saddle. The saddle generally comprises the saddle with at least one tension device 13' secured to a portion of the saddle. An adjustment member 15', as previously described, is threaded through a channel (not shown) in the saddle which may include a cable housing as previously described and connects at a lower end to a clamp assembly 19' and stirrup 53. The adjustment member 15' may include a retaining plate 16' for positioning of the adjustment member. The clamp assembly 19' comprises a first plate 19, second plate 31 with securing members as described above and shown in FIG. 8. The clamp assembly 19' is secured directly to the stirrup resulting in the lengthening and shortening of the stirrup directly through adjustment of the tension device.

FIG. 11 illustrates a form of stirrup adjustment assembly that may be attached to a pre-existing English saddle. The tension device 13' is secured to the adjustment member 15' and includes a securing loop 55 that is adapted to be secured to a stirrup bar, for example, on the saddle. The securing loop is made of high quality stainless steel or aluminum and includes a retaining plate 16', as described above. The adjustment member 15' includes a clamp assembly 19' that is secured directly to the stirrup 53, as described above.

In use, the stirrup adjustment assembly works in much the same manner as described above for the western saddle. The rider generally mounts on the left side of the saddle, using the left stirrup as a balance point to swing the rider right leg over the saddle. The rider then may assess the length and comfort of the stirrups. If adjustment is needed, the rider accesses the tension device, lengthening or shortening the adjustment member by activating the tension device.

The example aspects, disclosures, features, systems, methods, and acts described in the examples and described in the figures presented previously are illustrative, not intended to be exhaustive, and not meant to be limiting. In alternative examples, certain acts can be performed in a different order, in parallel with one another, omitted entirely, and/or combined between different examples, and/or certain additional acts can be performed, without departing from the scope and spirit of various examples. Plural instances may implement components, operations, or structures described as a single instance. Structures and functionality that may appear as separate in example embodiments may be implemented as a combined structure or component. Similarly, structures and functionality that may appear as a single component may be implemented as separate components. Accordingly, such alternative examples are included in the scope of the following claims, which are to be accorded the broadest interpretation to encompass such alternate examples. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An adjustable stirrup assembly for a riding saddle, the saddle having a cantle, seat, and at least one stirrup, the assembly comprising: at least one tension device having a spool member secured to the saddle; at least one adjustment member having a first terminal end secured to the at least one tension device; a second terminal end secured to at least one clamp member; the at least one clamp member comprising a first plate member having a plurality of openings; a second plate member adapted to engage with the first plate member; the first plate member having a recessed opening for passage of the adjustment member therethrough; and the at least one clamp member secured to a stirrup member.

2. The adjustable stirrup assembly according to claim 1 wherein the saddle includes a fender for securing of the at least one adjustment member with a retainer plate.

3. The adjustable stirrup assembly according to claim 1 whereby the adjustment member includes a double strand.

4. The adjustable stirrup assembly according to claim 1 wherein the stirrup member comprises a stirrup leather.

5. The adjustable stirrup assembly according to claim 4 wherein the clamp member comprises dual plates secured to the stirrup leather.

6. The adjustable stirrup assembly according to claim 1 wherein the at least one tension device is secured to a rear portion of the cantle.

7. The adjustable stirrup assembly according to claim 1 wherein the at least one tension device is secured to a fender of the saddle.

8. The adjustable stirrup assembly according to claim 1 wherein the saddle includes a channel member positioned for passage of the at least one adjustment member therethrough.

9. The adjustable stirrup assembly according to claim 8 wherein the saddle includes a cable housing.

10. An apparatus for adjusting the length of a rider's stirrup on a saddle, the saddle having a seat, at least one stirrup and a securing device, comprising: a tension device having a housing, spool member and rotation adjustment member; an adjustment member having a first terminal end rotatably secured to the spool member and a second terminal end secured to a clamp member; the clamp member having a first plate member with a plurality of openings; a second plate member adapted to engage with the first plate member; and the first plate member having a recessed opening for passage of the adjustment member therethrough; the clamp member secured to a stirrup member; and the at least one stirrup having a loop member.

11. The stirrup adjusting apparatus according to claim 10 wherein the adjustment member includes a retainer plate.

12. The stirrup adjusting apparatus according to claim 10 wherein the loop member is secured to the securing device.

13. The stirrup adjusting apparatus according to claim 10 wherein the tension device further comprises a rotation adjustment member.

14. A method of adjusting a stirrup while mounted in a saddle, the steps comprising: mounting of a saddle by a rider; selecting a length of stirrup based on leg position; rotating a spool member within a tension device secured to the saddle thereby adjusting a length of an adjustment member secured to a stirrup member, the adjustment member having a first terminal end rotatably secured to the spool member and a second terminal end secured to a clamp member; the clamp member having a first plate member with a plurality of openings; a second plate member adapted to engage with the first plate member; and the first plate member having a recessed opening for passage of the adjustment member therethrough; and the clamp member secured to a stirrup member.

15. The method according to claim 14 wherein the steps further include adjusting a stirrup length of one stirrup prior to mounting the saddle.

16. The method according to claim 14 wherein the steps further include readjusting the length of the stirrup after a first adjustment of the stirrup while remaining seated in the saddle.

* * * * *